United States Patent [19]

Masuda et al.

[11] Patent Number: 4,848,507
[45] Date of Patent: Jul. 18, 1989

[54] TORQUE-DEPENDENT POWER TRANSMISSION SYSTEM

[75] Inventors: Katsuhiko Masuda; Kazuhiko Shimada; Tetsuro Hamada; Kazunori Shibuya, all of Saitama, Japan

[73] Assignee: Honda Giken Kogyo K.K., Japan

[21] Appl. No.: 148,781

[22] Filed: Jan. 27, 1988

[30] Foreign Application Priority Data

Jan. 28, 1987 [JP] Japan .................................. 62-17733

[51] Int. Cl.⁴ ............................................. B60K 17/34
[52] U.S. Cl. .................................. 180/248; 192/48.6; 192/48.92
[58] Field of Search ............... 180/233, 248, 249, 250; 192/48.92, 48.6, 56 R

[56] References Cited

U.S. PATENT DOCUMENTS 3,249,187  5/1966  McDowall ................. 180/48.92 X
4,132,297  1/1979  Brown et al. ................ 180/248 X
4,425,989  1/1984  Gotoda ............................ 180/48.92

FOREIGN PATENT DOCUMENTS 59-18873  5/1983  Japan ................................ 180/248

Primary Examiner—John A. Pekar
Attorney, Agent, or Firm—Skjerven, Morrill, MacPherson, Franklin & Friel

[57] ABSTRACT

To the end of eliminating the problems arising from substantially rigid connection between a front wheel set and a rear wheel set in a four-wheel drive vehicle, there is provided a power transmission system in which a torque-dependent power transmission device is provided between the front wheel set and the rear wheel set so that both the wheel sets are substantially rigidly connected to each other in a low torque range and rotational power is transmitted only from the front wheel set to the rear wheel set in a high torque range. The power transmission device of this kind can be conveniently formed by a parallel combination of a one-way clutch and a torque limiter.

4 Claims, 4 Drawing Sheets

TORQUE-DEPENDENT POWER TRANSMISSION SYSTEM

TECHNICAL FIELD

The present invention relates to a power transmission system and in particular to such a power transmission system which is suitable for use in a four-wheel drive vehicle and other vehicles in which more than two wheel sets are power driven at the same time.

BACKGROUND OF THE INVENTION

Various forms of four-wheel drive vehicles have been proposed and many of them have already been put to actual uses. They can be generally grouped into those which are called as full-time four-wheel drive vehicles and those which are called as part-time four-wheel drive vehicles. In a full-time four-wheel drive vehicle, both the front wheels and the rear wheels are always power driven, typically by way of a central mechanical differential device. Alternatively, a viscous coupling which transmits torque substantially in proportion to the difference in the rotational speeds of its input member and output member may be interposed in the path of power transmission between the front wheel set and the rear wheel set in order to achieve a four-wheel drive. On the other hand, in a part-time four-wheel drive vehicle, either the front wheels or the rear wheels are normally not power driven at all but all the wheels are power driven typically by rigidly connecting the front wheel set and the rear wheel set together only when so selected by the driver. In some of the full-time four-wheel drive vehicles, the central differential device is provided with a lock mechanism for selective rigid locking up of the differential device to improve the capability of the vehicle to run on a frozen, muddy or otherwise slippery road surface.

In either case, it could happen for the front wheel set and the rear wheel set to be rigidly connected to each other. When that is the case, the braking force applied to one of the wheel sets is directly transmitted to the other wheel set. However, it is more desirable to have the front wheel set experience a greater braking force than the rear wheel set as is the case in most four-wheel vehicles for a balanced braking action and the rigid connection between the front wheel set and the rear wheel set causes the braking force to be evenly distributed between the front wheel set and the rear wheel set.

In order to eliminate this problem, Japanese Utility Model Laid-Open Publication No. 59-188731 (corresponding to German Patent Application No. P 33 17 247.1) proposed provision of a freewheel device in the path of power transmission between the front wheel set and the rear wheel set to the end of blocking the transmission of braking force from the front wheel set to the rear wheel set. However, according to this proposal, the braking force of the engine brake is also not transmitted to the rear wheel set. Thus, the advantage of four-wheel drive will be lost for instance when the vehicle goes down a slippery slope, since the braking force of the engine brake will not be transmitted to the rear wheels. Furthermore, when the vehicle goes backward, power will not be transmitted to the rear wheel set and, therefore, it will be necessary to provide a manual lock mechanism for locking up the freewheel device in view of the possibility of advancing backward in a muddy or otherwise slippery terrain.

BRIEF SUMMARY OF THE INVENTION

In view of these and other problems of the prior art, a primary object of the present invention is to provide a power transmission system which is suitable for use in a four-wheel drive vehicle in which the braking force is transmitted to the rear wheels when required and the advantages of four-wheel drive are maintained at all time.

A second object of the present invention is to provide a power transmission system for a four-wheel drive vehicle in which the braking force is transmitted from the front wheel set to the rear wheel set to the extent that the rear wheel set is not locked up thereby.

A third object of the present invention is to provide a power transmission system for a four-wheel drive vehicle which maintains the advantages of four-wheel drive even when the vehicle advances backward.

A fourth object of the present invention is to provide a power transmission device which achieves a key function in a power transmission system of the above mentioned kind.

These and other objects of the present invention will be accomplished by providing a power transmission device for transmitting rotational power between a rotating input member and a rotating output member; comprising a combination of a one-way clutch means and a torque limiting means which transmits rotational power both ways between the input member and the output member in a low torque range and transmits rotational power only from the input member to the output member in a high torque range. Preferably, the one-way clutch means and the torque limiting means are connected in parallel to each other.

Thus, by using this device, when a torque of less than a certain value is transmitted between the input member and the output member, the advantages of the four-wheel drive can be obtained and the braking force arising from either a brake device or the engine brake can be transmitted to all the wheels for effective braking action. However, an excessive braking force which would lock up the rear wheels is prevented from being transmitted to the rear wheels while there is no such limit to the drive torque which can be transmitted from the engine to the rear wheels. Here, it should be noted that the transmission of braking force from the engine or the front wheels to the rear wheels is equivalent to the transmission of drive force from the rear wheels to the engine (engine brake) or to a brake device for the front wheels (normal braking).

According to a preferred embodiment of the power transmission device according to the present invention, the torque limiting means comprises frictional members interposed between the input member and the output member and a biasing means which presses the frictional members one over the other.

According to a preferred embodiment of the power transmission system according to the present invention, the power transmission device of the above described kind is connected in series with a power splitting means in a path of power transmission between the front wheel set and the rear wheel set of the vehicle. Preferably, the power splitting means consists of a viscous coupling of a type having a single input and a single output or, alternatively, a single input and a pair of outputs so as to perform the function of a differential device as well as viscous coupling connecting the front wheel set and the rear wheel set together.

According to a certain aspect of the present invention, the parallel combination of the one-way clutch means and the torque limiting means is connected in a path of power transmission between the power source and the rear wheel set, preferably in series with a viscous coupling.

BRIEF DESCRIPTION OF THE DRAWINGS

The above-mentioned and other features and objects of this invention and the manner of obtaining them will become more apparent and the invention itself will be better understood by reference to the following description of embodiments of this invention taken in conjunction with the accompanying drawings, in which.

DETAILED DESCRIPTION OF THE PREFERRED EMBODIMENTS

Figure 1:
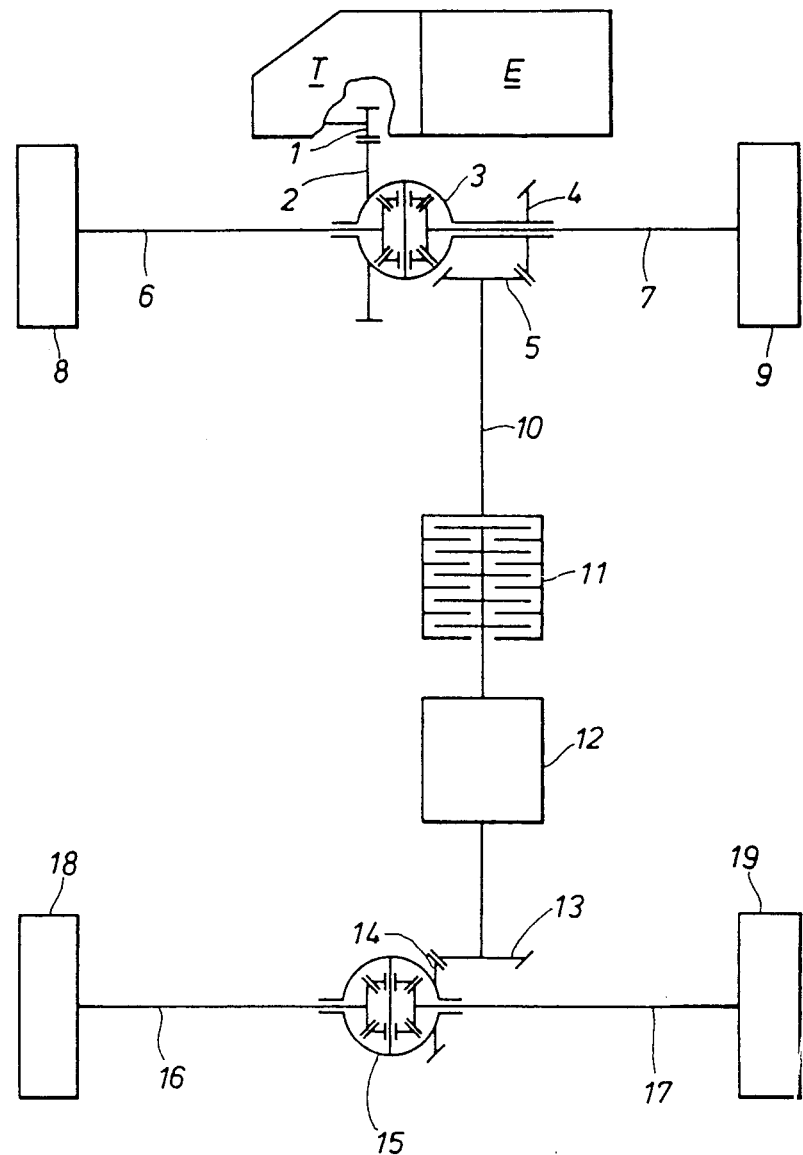
FIG. 1 is a skeleton diagram of a first embodiment of the power transmission system for a vehicle according to the present invention.

FIG. 1 is a skeleton diagram of an embodiment of the power transmission system for a four-wheel drive vehicle according to the present invention. The power from an engine E is transmitted to an input end of a differential device 3 for front wheels by way of a transmission device T and spur gears 1 and 2. Output ends of this differential device 3 are connected to the right and the left front wheel 8 and 9 of the vehicle by way of axles 6 and 7 in a conventional manner.

The input end of the differential device 3 is also connected to an input end of a viscous coupling 11 by way of conical gears 4 and 5 and a propeller shaft 10. An output end of the viscous coupling 11 is connected to an input end of a power transmission device 12 which is described hereinafter, and an output end of the power transmission device 12 is connected to an input end of a differential device 15 for rear wheels 18 and 19 by way of conical gears 13 and 14. Output ends of the differential device 15 are connected to the right and the left front wheel 18 and 19 of the vehicle by way of axles 16 and 17.

Figure 2:
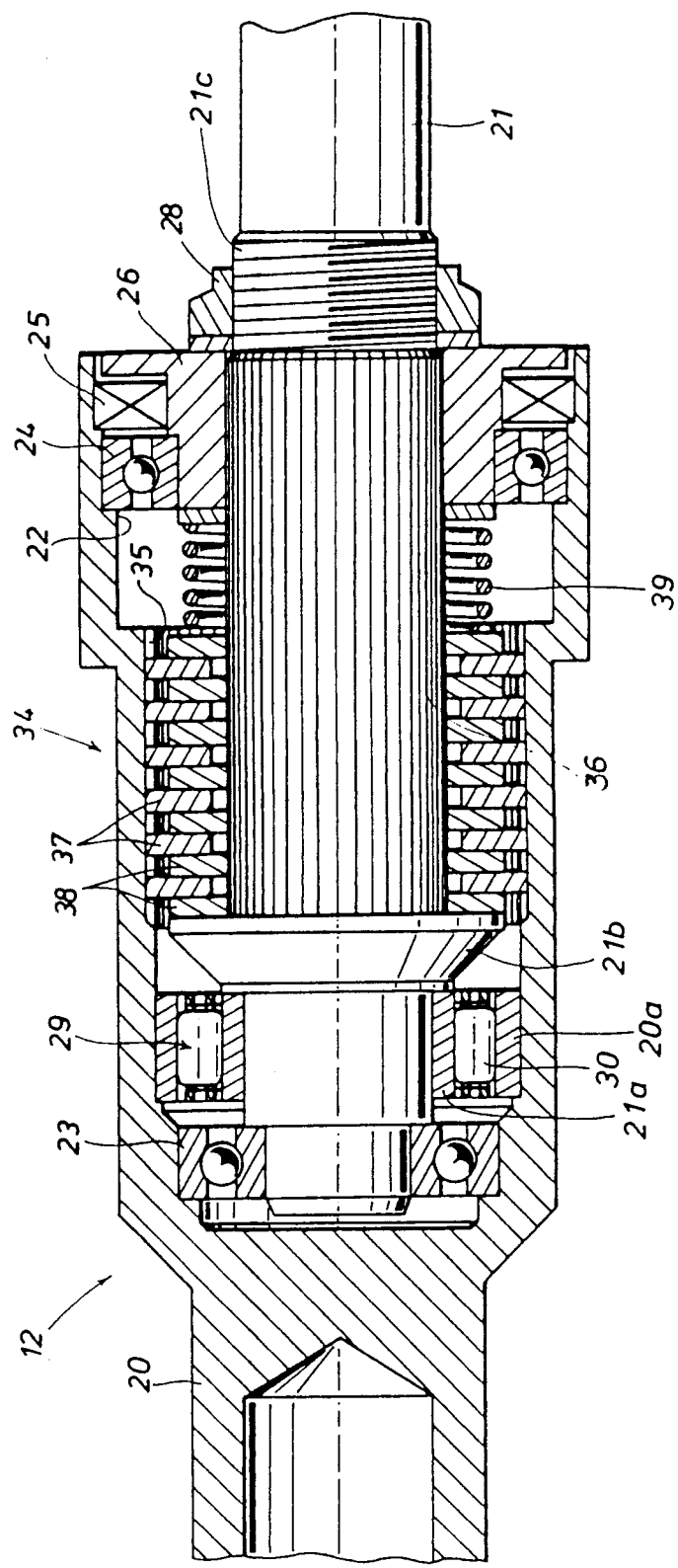
FIG. 2 is a sectional view of the power transmission device used in the embodiment shown in FIG. 1.
Figure 3:
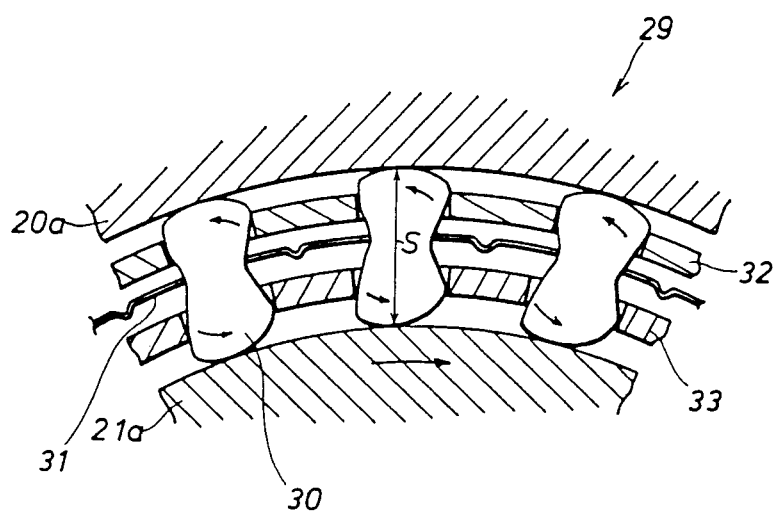
FIG. 3 is a magnified sectional view showing some of the sprags of the one-way clutch of FIG. 2.

As shown in FIGS. 2 and 3, the power transmission device 12 is provided with a tubular input member 20 which is connected to the output end of the viscous coupling 11 and an output member 21 consisting of a shaft which is coaxially received in the input member 20 and is connected to the conical gear 13. Thus, an annular space 22 is defined between the input member 20 and the output member 21 and ball bearings 23 and 24 are interposed between them at either longitudinal end of the annular space 22. A one-way clutch 29 is interposed between the input member 20 and the output member 21 adjacent to one of the ball bearings 23.

This one-way clutch 29 comprises, as best shown in FIG. 3, a plurality of sprags 30 which are arranged at equal interval along a circumferential direction between the input member 20 and the output member 21 and each of the sprags 30 is provided with a narrow middle part and a pair of substantially cylindrical surfaces at either radial end thereof for rolling contact with the outer circumferential surface of an inner ring 21a and the inner circumferential surface of an outer ring 20a, respectively, which are fixedly fitted onto and into the outer and inner circumferential surface of the output member 21 and the input member 20, respectively.

The distance between the points of contact of each of the sprags 30 or the strut contact distance S increases and decreases as the sprag rolls over the outer circumferential surface of the inner ring 21a and the inner circumferential surface of the outer ring 20a as a result of a relative rotation between the input member 20 and the output member 21. The ribbon springs 31, which are arranged between adjacent sprags, urge the sprags 30 in the direction to increase their strut contact distances S as indicated by the arrows in FIG. 3. Retaining rings 32 and 33 are provided for synchronizing the rolling motion of the sprags 30.

Thus, as the input member 20 (and its fixed outer ring 20a) is turned in clockwise direction (forward drive) in FIG. 3, the sprags 30 roll in the direction to increase their strut contact distances S and power is transmitted from the tubular input member 20 to the output shaft member 21 by way of the sprags 30. Conversely, as the output member 21 is turned in clockwise direction (forward brake) as seen by the arrow in inner ring 21a in FIG. 3, the struts strut contact distance S of the sprags 30 are reduced and power is not transmitted from the output member 21 to the input member 20. However, when the rotational direction is reversed (reverse drive and reverse brake), the direction of power transmission is reversed as a matter of general behavior of a one-way clutch.

As shown in FIG. 2, a part of the output member 21 adjacent to the one-way clutch 29 is provided with a flange 21b and a splined portion 36 is provided on the outer circumferential surface of the output member 21 between the flange 21b and a threaded portion 21c provided in the output member 21 adjacent to the free end of the input member 20. The opposing inner circumferential surface of the input member 20 is provided with a splined portion 35. A plurality of annular clutch plates 37 and 38 are engaged to the splined portions 35 and 36 at their inner circumferential edges and outer circumferential edges, respectively, in an alternating manner so that the clutch plates integrally rotate with either the input member 20 or the output member 21 to which they are engaged but are allowed to move freely in the longitudinal direction in the manner of a conventional multiple-disc clutch. The inner most clutch plate 38 contacts the flange 21b while the outer most clutch plate 38 is biased by a compression coil spring 39 inwardly. The other end of the compression spring 39 is engaged to a collar 26 which is held in position onto the output member 21 by means of a nut 28 threaded with the threaded portion 21c of the output member 21. The inner ring of the ball bearing 24 is fitted onto this collar 26 and an oil seal 25 is interposed between the inner circumferential surface of the outer most end of the input member 20 and the opposing outer circumferential surface of the collar 26.

Now the action of the embodiment of the power transmission device shown in FIGS. 2 and 3 is described in the following.

When a torque of a relatively small level is to be transmitted by the power transmission device 12, since the clutch plates 37 and 38 are pressed to each other by the compression coil spring 39, the torque can be transmitted in either direction. When a relatively large torque is to be transmitted from the input member 20 to the output member 21, the one-way clutch 29 transmits the torque no matter how large the torque is. However, when a relatively large torque is to be transmitted from the output member 21 to the input member 20, the one-way clutch 29 permits a free relative rotation between the input member 20 and the output member 21 while the clutch plates 37 and 38 slip one over the other by overcoming the frictional force produced therebetween, thus permitting the transmission of a relatively small torque.

Thus, in FIG. 1, the forward driving torque from the engine E is transmitted to the rear wheels 18 and 19 by way of the conical gears 4 and 5, the propeller shaft 10, the viscous coupling 11, the power transmission device 12, the conical gears 13 and 14, the differential device 15 and the axles 16 and 17 irrespective of the magnitude of the torque to be transmitted. When a light braking force, for instance by the drag of the engine when its throttle valve is closed, is applied to the front wheels 8 and 9, it is likewise transmitted to the rear wheels 18 and 19 by means of the frictional engagement between the clutch plates 37 and 38 of the power transmission device 12. However, when a large braking force is applied to the front wheels 8 and 9, it is prevented from being transmitted to the rear wheels 18 and 19 because the clutch plates 37 and 38 slip over each other by overcoming the frictional engagement therebetween.

Here, it should be noted that the transmission of braking force from the engine or the front wheels to the rear wheels is equivalent to the transmission of drive force from the rear wheels to the engine (engine brake) or to a brake device for the front wheels (normal braking).

Thus, according to the power transmission system of the present invention, the advantages of four-wheel drive is maintained in all conditions and only a large braking force is prevented from being transmitted to the rear wheels with the result that the problem of potential instability arising from locking up of the rear wheels as a result of a sudden braking action is avoided.

When the rotational direction is reversed or when the vehicle goes backward, the path of power transmission is reversed. When a torque of a relatively small level in a reverse rotational direction is to be transmitted by the power transmission device 12, since the clutch plates 37 and 38 are pressed to each other by the compression coil spring 39, the torque can be transmitted in either direction in the same way as in the case of a torque of a forward rotational direction. When a relatively large torque in the reverse rotational direction is to be transmitted from the output member 21 to the input member 20, the one-way clutch 29 transmits the torque no matter how large the torque is. However, when a relatively large torque is to be transmitted from the the input member 20 to the output member 21, the one-way clutch 29 permits a free relative rotation between the input member 20 and the output member 21 while the clutch plates 37 and 38 slip one over the other by overcoming the frictional force produced therebetween.

Thus, when the vehicle goes backward, the power transmission device 12 permits power transmission except for the case when a large torque is to be transmitted from the front wheels to the rear wheels and, in this case, the torque to be transmitted is limited by the slipping of the clutch discs 37 and 38. In other words, when a vehicle goes backward, there is a limit to the torque to be transmitted to the rear wheel. However, it is not a practical problem since this limit is selected to be sufficiently high for a drive torque but is sufficiently low to prevent the locking up of the rear wheels as a result of a sudden braking action.

Figure 4:
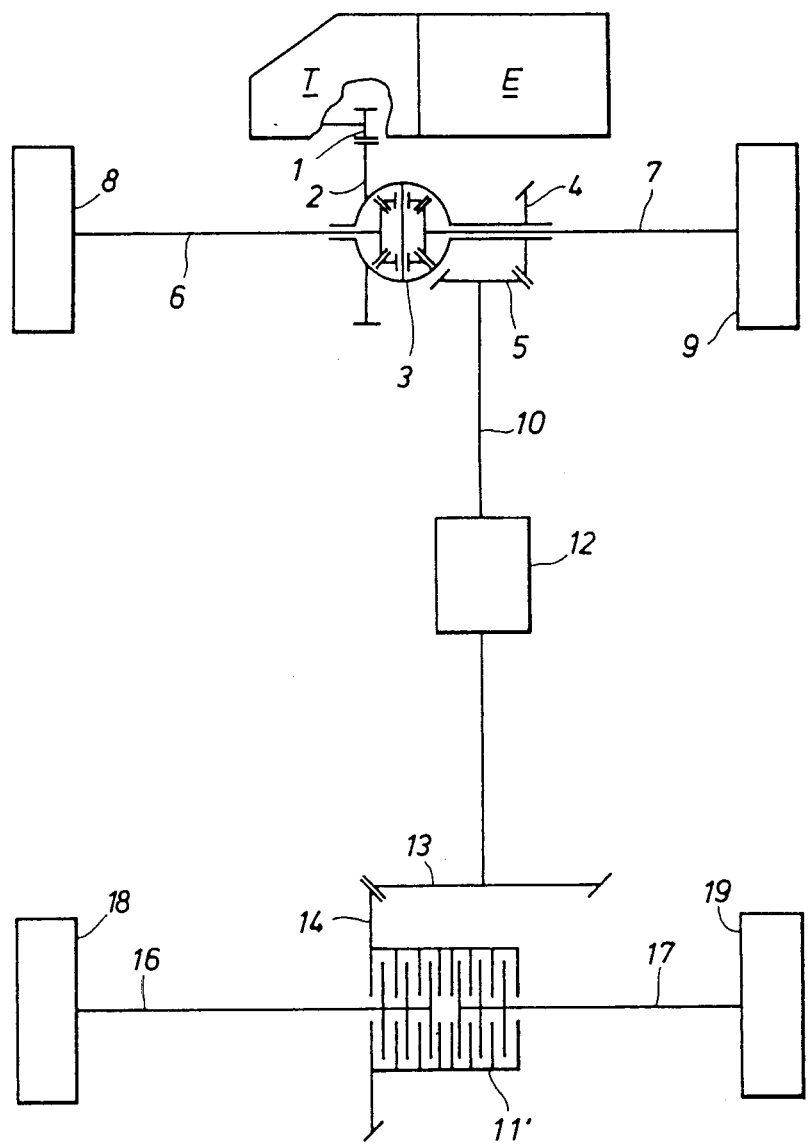
FIG. 4 is a view similar to FIG. 1 showing a second embodiment of the power transmission system according to the present invention.

FIG. 4 shows a second embodiment of the power transmission system according to the present invention. In FIG. 4, those parts corresponding to the various parts of the embodiment of FIG. 1 are denoted with like numerals and their detailed description is omitted.

In the embodiment shown in FIG. 4, the rear end of the propeller shaft 10 is connected to a pair of conical gears 13 and 14 for transmitted power from the engine E to a power transmission device 12', which is similar to the power transmission device 12 shown in FIGS. 2 and 3, having an input shaft and an output shaft which are coaxial with the axles 16 and 17 of the rear wheels 18 and 19. The output shaft of the power transmission device 12' is connected to a casing of a viscous coupling 11' which splits the power transmitted to its casing to the axles 16 and 17.

Thus, according to the present invention, the dynamic behavior of a four-wheel drive vehicle using a viscous coupling can be improved simply by adding a power transmission device which transmits power both ways in a low torque range by transmits power only in one direction in a high torque range.

Although the present invention has been described and shown in connection with vehicles in which the front wheels are directly driven by an engine while the rear wheels are driven by the engine by way of a viscous coupling, the present invention can be equally applied to those vehicles in which the rear wheels are directly driven by an engine while the front wheels are driven by the engine by way of a viscous coupling. Further, the power splitting means is not limited to the viscous couplings of the types mentioned above but may also be other power splitting means which permit transmission of braking force from the front wheels to the rear wheels. Yet further, the one-way clutch means and the torque limiting means are not limited to the kinds described above but may also be those which are actuated by other mechanical means, electronic means or hydraulic means without departing from the spirit of the present invention.

What we claim is:

1. A power transmission system for a vehicle having at least a front wheel set and a rear wheel set which are driven by a common power source, comprising:
   a combination of a one-way clutch means and a torque limiting means which transmits rotational power both ways between its input member and its output member in a low torque range and transmits rotational power only from the input member to the output member in a high torque range; and
   a power splitting means for splitting power from the common power source between the front wheel set and the rear wheel set;
   the one-way clutch means and the torque limiting means being connected to each other in a mutually parallel relationship while the parallel combination of the one-way clutch means and the torque limiting means is connected in series with the power splitting means in a path of power transmission between the front wheel set and the rear wheel set.

2. A power transmission system as defined in claim 1, wherein the power splitting means consists of a viscous coupling which is connected between input ends of a pair of differential devices for the front wheel set and the rear wheel set, respectively.

3. A power transmission system as defined in claim 1, wherein the power splitting means consists of a viscous coupling having an input end which is connected to the power source and a pair of output ends which are connected to axles of one of the wheel sets; the parallel combination of the one-way clutch means and the torque limiting means being connected between the power source and the input end of the viscous coupling means.

4. A power transmission system for a vehicle having at least a front wheel set and a rear wheel set which are driven by a common power source, comprising:
- a parallel combination of a one-way clutch means and a torque limiting means which transmits rotational power both ways between its input member and its output member in a low torque range and transmits rotational power only from the input member to the output member in a high torque range;
- the parallel combination of the one-way clutch means and the torque limiting means being connected in a path of power transmission between the power source and the rear wheel set; and
- wherein the parallel combination of the one-way clutch means and the torque limiting means is connected in the path of power transmission between the power source and the rear wheel set in series with a viscous coupling.

* * * * *